May 7, 1940.  J. W. DAWSON  2,200,077
ELECTRONIC SEAM WELDING FOR HIGH SPEED WELDING
Filed May 7, 1938

WITNESSES:
E. A. McCloskey
R. W. Bailey

INVENTOR
John W. Dawson.
BY
F. W. Lyle
ATTORNEY

Patented May 7, 1940

2,200,077

UNITED STATES PATENT OFFICE 2,200,077

ELECTRONIC SEAM WELDING FOR HIGH SPEED WELDING

John W. Dawson, Auburndale, Mass., assignor to Westinghouse Electric & Manufacturing Company, East Pittsburgh, Pa., a corporation of Pennsylvania Application May 7, 1938, Serial No. 206,638

1 Claim. (Cl. 172—281)

My invention relates to a welding system and particularly to an electronic seam welding control for high speed welding.

An object of the invention is to utilize multi-phase current for energizing the electrodes of a welding system.

Another object of the invention is to multiply the frequency of an alternating current source.

Another object of the invention is to use a higher frequency of alternating current on the welding electrodes than that of the usual commercial current.

Figure 1:
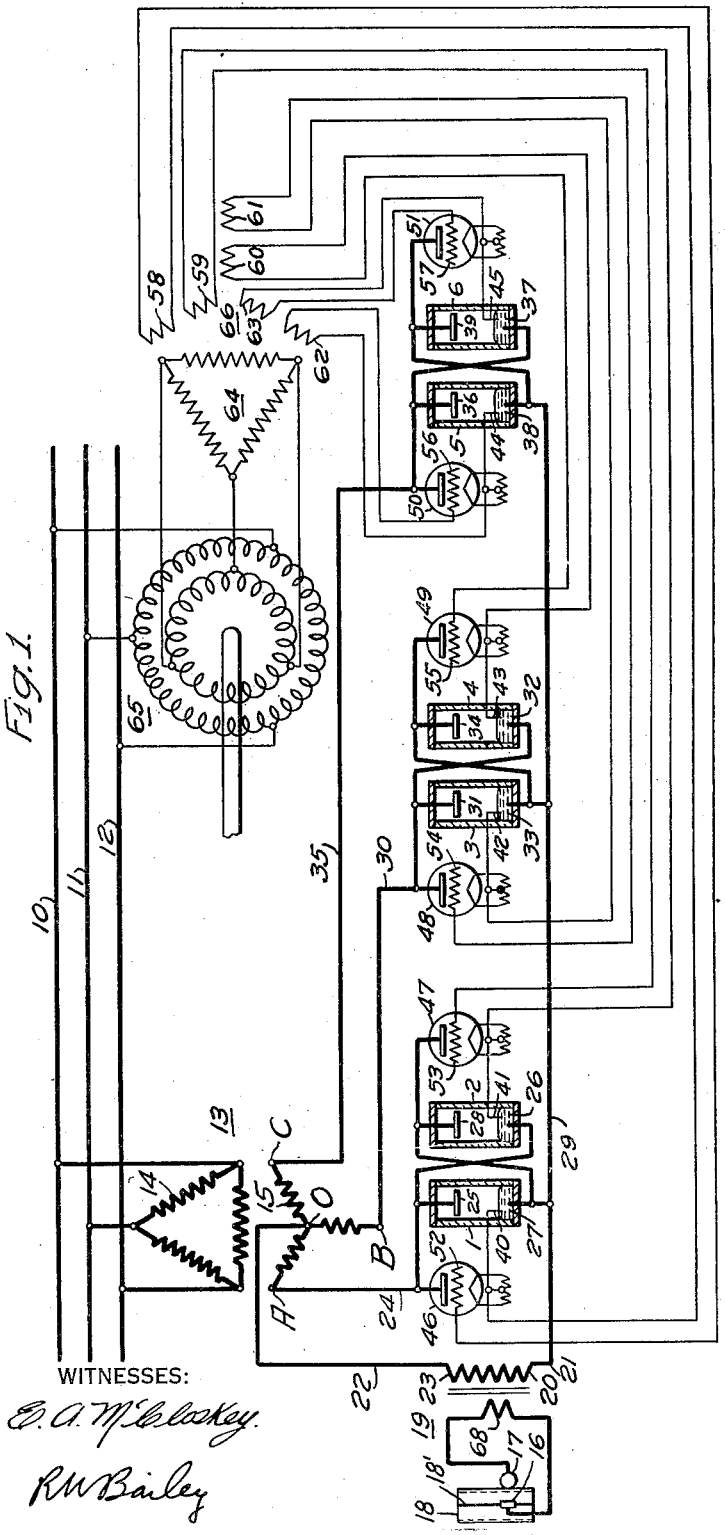
Figure 2:
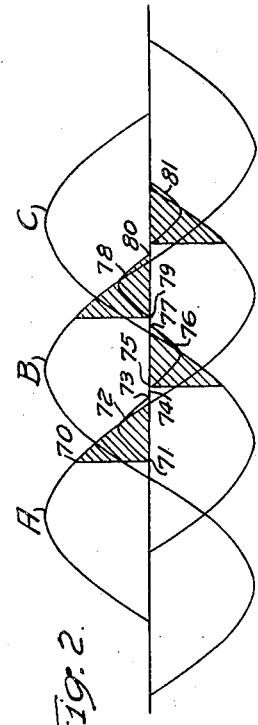

Other objects and advantages of the invention will be apparent from the following description and drawing, in which Figure 1 is a diagrammatic circuit illustrating a preferred application of the invention; and Fig. 2 is a graph illustrating the multi-phase energizing voltage and the higher frequency of the welding current.

It has been found that production speed in applications of seam welding utilizing continuous single phase 60-cycle current was limited because of leaks resulting from welds too far apart.

In the canning industry, for example, the present production speed is 300 to 350, five inch cans per minute which speed is too fast for present types of welders. I have accordingly designed my invention to utilize multi-phase current instead of this continuous single phase 60-cycle current and also to provide a higher frequency of cycles as applied to the welding electrodes. In Fig. 1, I have disclosed the current lines of a multi-phase system comprising the lines 10, 11 and 12. These lines may be of usual 60 cycle commercial current. Connected to these lines is a three-phase transformer 13 having a primary 14 and a secondary 15 of preferably Y-shape having terminals A, B and C and a common terminal 0. The welding electrodes 16 and 17, preferably in the form of rollers to provide seam welding on the work or load 18, are connected through a welding transformer 19 to the secondary 15 of the multi-phase transformer.

The particular welding load illustrated is the cylindrical side 18 of a tin can having its lateral seam 18' welded under the roller 16. The tin can is held in a suitable mandrel and the current may return through another roller 17 or by a connection to the mandrel. The top and bottom of the can may also be welded. One end 23 of the primary 20 of the welding transformer 19 is preferably connected through 22 to the common point 0 of the three-phase transformer secondary 15. Intermediate the other end 21 of the welding secondary transformer and the various terminals A, B and C of the multi-phase transformer 15 are preferably a plurality of electric valves 1, 2, 3, 4, 5 and 6. These valves may take various forms, but I prefer to utilize the construction of an arc discharge device under make-alive control, as described in the patent to Slepian et al. 2,069,283, issued February 2, 1937. The terminal A of transformer secondary 15 is connected by 24 to the anode 25 of electric valve 1 and to the cathode 26 of electric valve 2. The cathode 27 of electric valve 1 and the anode 28 of valve 2 are connected by 29 to the terminal 21 of the primary 20 of the welding transformer 19. The terminal B is connected by 30 in a similar manner to the anode 31 of electric valve 3 and cathode 32 of electric valve 4 and the cathode 33 of electric valve 3 and the anode 34 of electric valve 4 are connected to 29, which, in turn, extends to the terminal 21 of the secondary 20 of the welding transformer 19. In a similar manner, the terminal C is connected by 35 through the anode 36 of valve 5 and cathode 37 of the valve 6 across the discharge space to the cathode 38 of valve 5 and anode 39 of valve 6 to the connection 29 and the welding transformer secondary 20. In order to energize the respective make-alives 40, 41, 42, 43, 44 and 45 of the electric valves 1 through 6, I provide discharge devices 46, 47, 48, 49, 50 and 51, having their anodes connected to the anodes of the valves and their cathode connected to the make-alives.

Each of these discharge devices has the discharge therethrough under control of the respective grids 52, 53, 54, 55, 56, and 57. The grids and cathodes of these discharge devices are preferably connected to a plurality of coils 58, 59, 60, 61, 62 and 63 through a Y-connected secondary to a three-phase primary 64 preferably energized through a suitable phase shift device 65 from the multi-phase lines 10, 11 and 12. The coils 58 and 59 form one leg of the Y secondary 66, and the connections to the coil 59 and tube 47 are reversed to that of the connections between coil 58 and the discharge device 46. Similarly, the coils 60 and 61 form another leg of the secondary 68 and 62, and 63 likewise forms the third leg.

The phase shift device 65 is utilized to control the portion of the welding current desired in each phase. The secondary 66 energizes the various grids 52 to 57 to permit the respective discharge devices 46 through 51 to energize, in turn, the make-alives 40 through 45. The operation of the device will be more apparent by including reference to Fig. 2. This figure discloses the three-phase voltage as applied to the terminals A, B and C of the secondary 15. The circuit is connected and applied at the point 70 on the curve A of Fig. 2. This means a positive voltage at the terminal A and this voltage will fire electric valve 1 and the current will pass through 1 to the cathode 27 and connection 29, primary 20 and back to the common point 0, thus energizing the secondary 68 of the welding transformer and also the welding electrodes 16 and 17. This welding current begins at point 71 on the zero line of Fig. 2 and has the positive half cycle 72 illustrated in Fig. 2. The length of this cycle is short because the energizing coil 58 starts the valve 1 late in the positive half period of phase A. The welding current through this particular valve 1 stops at the point 73 and there is preferably a short interval 74 between the termination of this half cycle and the next half cycle which can be arranged by adjustment of the phase shift device 65. The half cycle 72 of the welding current is passed from the terminal A through the primary 20 and back to the common point 0 through the secondary 15. The next half cycle will be in the opposite direction and at this time the wave of current will be negative in phase C as indicated on the drawing. The reverse phase will accordingly pass from 0 through 20 through the electric valve and will return it to phase C. This happens to be the electric valve 6 and has its anode connected to the terminal 23 of the primary 20 and its cathode to the terminal C of secondary 15. The electric valve 6 will be energized at 75 and continue its half wave of welding current 76 until it decreases at 77 to zero. For the next half cycle of welding current, a positive half cycle of welding current from one of the legs of the transformer is necessary and this means a passage of current from B through the electric valve 3 to the primary 20 and back to the common point 0. This is indicated on the curves of Fig. 2 by the half cycle 78 extending between the points 79 and 80. The next half cycle 81 of welding current will be negative and will pass from the common point 0 through primary 20 of the welding transformer and the electric valve 2 to the terminal A. In a similar manner, the next positive half cycle of current will be from C through the electric valve 5 to the primary 20 and back to the common point 0. The last half cycle will be from the common point 0 through the primary 20 and electric valve 4 to the phase B.

It will be noted that the energizing current applied to the welding electrodes 16 and 17 is that of multi-phase current in contrast to the continuous current heretofore utilized. Furthermore, the number of cycles applied to the welding load has been multiplied by three with the result that 180 cycle current is utilized in the load in place of the 60-cycle current supplied by the commercial lines. The number of cycles could be still further multiplied if desired by using phase multiplying transformers connected to the source and correspondingly increasing the number of electric valves and auxiliary control circuits.

Many modifications may be made in the preferred embodiment without departing from the spirit of the invention. Accordingly, I desire only such limitations to be placed upon the following claim as is necessitated by the prior art.

I claim as my invention:

An electrical supply circuit comprising a multiphase transformer, two reversely connected valves connected to each phase of the secondary of the transformer and through a load to the common point thereof, a second transformer having a secondary having twice the windings of the first mentioned secondary, a control discharge device connected to each valve, each of said windings energizing one of said control discharge devices.

JOHN W. DAWSON.